United States Patent [19]

Tanahashi et al.

[11] Patent Number: 5,749,802
[45] Date of Patent: May 12, 1998

[54] AUTOMATIC TRANSMISSION CONTROL APPARATUS

[75] Inventors: Katsuyuki Tanahashi; Hiroshi Tsutsui; Yoshihisa Yamamoto; Kazumasa Tsukamoto, all of Aichi-ken, Japan

[73] Assignee: Aisin AW Co., Ltd., Aichi-ken, Japan

[21] Appl. No.: 646,467

[22] Filed: May 8, 1996

[30] Foreign Application Priority Data

May 12, 1995 [JP] Japan ..................... 7-138377

[51] Int. Cl.⁶ ................................... F16H 61/00
[52] U.S. Cl. ........................... 475/120; 477/117
[58] Field of Search ..................... 475/119, 120, 475/123, 127, 132; 477/117, 906

[56] References Cited

U.S. PATENT DOCUMENTS

| | | | |
|---|---|---|---|
| 4,850,251 | 7/1989 | Kuwayama et al. | |
| 5,005,444 | 4/1991 | Kimura et al. | 477/117 |
| 5,088,357 | 2/1992 | Kamada et al. | 477/117 |
| 5,329,830 | 7/1994 | Kitagawa et al. | 475/120 |
| 5,334,114 | 8/1994 | Ando et al. | |
| 5,337,625 | 8/1994 | Jang | 477/906 |
| 5,351,577 | 10/1994 | Ando et al. | |
| 5,367,922 | 11/1994 | Jan | 475/123 |
| 5,445,578 | 8/1995 | Koenig et al. | 477/906 |

FOREIGN PATENT DOCUMENTS

A-63-106447   5/1988   Japan.

*Primary Examiner*—Dirk Wright
*Attorney, Agent, or Firm*—Oliff & Berridge

[57] ABSTRACT

An automatic transmission control apparatus has first and second hydraulic servos for engaging forward and reverse driving friction engaging elements, respectively, a fluid pressure control unit, a range shift detector, and an electronic control unit. When the forward driving range is selected, the fluid pressure control unit supplies a forward driving range pressure to the hydraulic servo via a changeover valve operated by a signal pressure from a normal open-type solenoid valve, when the signal pressure is drained. When the reverse driving range is selected, the electronic control unit outputs a signal to magnetize the solenoid valve. The solenoid valve is thus turned on to discontinue the drain. The control apparatus thus prevents low pressure in the reverse driving range pressure to prevent delay of engagement of the clutch.

6 Claims, 7 Drawing Sheets

FIG. 3

|   |     | Clutch | | | Brake | | | | One-Way Clutch | | |
|---|-----|----|----|----|----|----|----|----|----|----|----|
|   |     | C1 | C2 | C3 | B1 | B2 | B3 | B4 | F1 | F2 | F3 |
| R |     | ×  | ○  | ×  | ×  | ×  | ○  | ○  | ×  | ×  | × |
| N |     | ×  | ×  | ×  | ×  | ×  | ×  | ○  | ×  | ×  | × |
| D | 1ST | ○  | ×  | ×  | ×  | ×  | (○)| ○  | ×  | ○  | ○ |
|   | 2ND | ○  | ×  | ×  | ○  | ○  | ×  | ○  | ○  | ×  | ○ |
|   | 3RD | ○  | ×  | ○  | ○  | ○  | ×  | ×  | ○  | ×  | × |
|   | 4TH | ○  | ○  | ○  | ×  | ○  | ×  | ×  | ×  | ×  | × |

AUTOMATIC TRANSMISSION CONTROL APPARATUS

BACKGROUND OF THE INVENTION

1. Field of the Invention

The invention relates to an automatic transmission control apparatus and, more particularly, to a control apparatus for controlling the engagement and release of two friction engaging elements for achieving forward and reverse driving of a vehicle.

2. Description of the Related Art

A typical automatic transmission employs a friction engaging element, that is, a clutch, that is disposed in the transmission mechanism and engaged to achieve the forward driving of the vehicle. Japanese patent application laying-open No. SHO 63-106447 discloses an arrangement in which a changeover valve is disposed in part of the fluid passage of a fluid pressure control apparatus for supplying a fluid pressure to a hydraulic servo that performs engagement and release of a clutch that engages when a forward driving (D) range is selected, the changeover valve selectively connecting the D range pressure fluid passage or the fluid passage for supplying the fluid pressure from a pressure regulating valve to the hydraulic servo in order to control the fluid pressure supply to the hydraulic servo to a predetermined state (neutral control).

The conventional changeover valve described above is switched by supplying a signal pressure controlled by a solenoid valve to the signal pressure port of the changeover valve or discharging the signal pressure therefrom. There is a requirement for this type clutch that is engaged to achieve the forward driving when the D range is selected. That is, the clutch needs to achieve and maintain a condition that allows for the forward driving by maintaining the engagement of the clutch even if a failure should occur in the hydraulic circuit. To achieve this requirement, the hydraulic servo for engaging the clutch is supplied with fluid pressure by the following circuit structure. The changeover valve is designed to maintain the communication between the D range pressure fluid passage and the hydraulic servo even if supply of the signal pressure fails due to a clogging of the fluid passage or the like. The solenoid valve is designed in a normal open arrangement in which the solenoid valve drains the signal pressure when demagnetized, in order to maintain the condition where no signal pressure is supplied to the changeover valve even if supply of electric signal is discontinued. With this structure, it is inevitable that the solenoid valve assumes a drain state where no signal pressure is supplied to the changeover valve, and the changeover valve connects the D range pressure fluid passage with the hydraulic servo, except when predetermined control is performed.

According to the conventional art, supply of fluid pressure to the hydraulic servo and control of the fluid pressure to be supplied need to be performed only when the D range is selected. As a result, to avoid unnecessary consumption of fluid pressure, the basic pressure of the signal pressure is taken from the D range pressure fluid passage, into which the manual valve allows output, only when the D range is selected. If such a conventional apparatus is used for the N-to-D control that causes the clutch to engage with a predetermined engaging characteristic for the N-to-D shift from the non-driving (N) range to the D range, the changeover valve needs to be shifted to a position to achieve communication between the pressure regulating valve and the hydraulic servo substantially simultaneously with the N-to-D shift. However, in the structure where the D range pressure is taken as the basic pressure of the signal pressure, the signal pressure can be output only after the N-to-D shift of the manual valve has caused the D range pressure to be supplied to the D range pressure fluid passage. Thus, the conventional structure has a problem in that if supply of the D range pressure delays, the switching of the changeover valve will also delay.

SUMMARY OF THE INVENTION

To overcome the above-stated problem, a structure may be considered, where the basic pressure of the signal pressure controlled by the solenoid valve is set to the line pressure constantly supplied regardless of the switching of the manual valve. However, such a structure will cause another problem as follows. When shift has been made to the reverse driving (R) range, the line pressure is drained from the solenoid valve to cause an unnecessary addition to fluid pressure consumption. As a result, when a fluid pressure is to be supplied to the hydraulic servo for the reverse driving friction engaging element, the unnecessary additional fluid pressure consumption affects the supply of the fluid pressure to the hydraulic servo, delaying the engagement of the reverse driving friction engaging element and, therefore, delaying achievement of the reverse driving.

Accordingly, a first object of the invention is to provide a control apparatus comprising a hydraulic circuit that enables the forward driving even when a failure has occurred as described above, which prevents delay in achievement of the reverse driving by reducing fluid loss in the hydraulic circuit by control of the solenoid valve.

A second object of the invention is to reduce to minimum required levels the heat generation from the solenoid valve and the power consumption increase of the control apparatus that occur during the control of the solenoid valve for reducing the above-mentioned fluid loss.

A third object of the invention is to perform the control of the solenoid valve for reducing the above-mentioned fluid loss with a simple structure and with good precision and reliability.

When the engine speed is high, the oil pump driven together with revolution of the engine outputs sufficiently high discharge pressure. In such occasions, the line pressure, which is based on the discharge pressure, becomes also high with a sufficiently large capacity. Thus, the problem of delay in achievement of the reverse driving caused by low pressure and insufficient capacity is eliminated even if there is a drain from the solenoid valve. Accordingly, a fourth object of the invention is to reduce the power consumption and the heat generation by the solenoid valve by stopping the control of the solenoid valve for reducing the above-mentioned fluid loss when the engine speed is high.

According to the present invention, there is provided an automatic transmission control apparatus comprising: a first friction engaging element which, when a forward driving range is selected, is engaged to achieve forward driving; a second friction engaging element which, when a reverse driving range is selected, is engaged to achieve reverse driving; first hydraulic servo and second hydraulic servo for engaging and releasing the first friction engaging element and the second friction engaging element, respectively; fluid pressure control means for controlling fluid pressure supply to the first hydraulic servo and the second hydraulic servo; range shift detecting means for detecting shift to the forward driving range and shift to the reverse driving range; and electronic control means for controlling the fluid pressure control means on the basis of a signal of detection of the range shift detecting means. The fluid pressure control means comprises: an oil pump driven together with revolution of an engine, the oil pump forming a fluid pressure source for line pressure; a manual valve for supplying a forward driving range pressure as the line pressure to the first hydraulic servo when the forward driving range is selected, and for supplying a reverse driving range pressure as the line pressure to the second hydraulic servo when the reverse driving range is selected; pressure regulating means disposed between the manual valve and the first hydraulic servo, for regulating the forward driving range pressure on the basis of a signal from the electronic control means to output a regulated fluid pressure; a changeover valve having a signal pressure port to which a signal pressure is selectively supplied, the changeover valve supplying the forward driving range pressure to the first hydraulic servo when the signal pressure is being supplied to the signal pressure port, and the changeover valve supplying the regulated fluid pressure from the pressure regulating means to the first hydraulic servo when the signal pressure is not supplied to the signal pressure port; and a solenoid valve for supplying the signal pressure as the line pressure to the signal pressure port of the changeover valve when magnetized on the basis of a signal from the electronic control means, and for discharging the signal pressure from the signal pressure port when demagnetized. The electronic control means comprises: first signal outputting means for, when the range shift detecting means has detected shift to the forward driving range, outputting a signal to magnetize the solenoid valve and to cause the pressure regulating means to output a predetermined regulated fluid pressure; and second signal outputting means for, when the range shift detecting means has detected shift to the reverse driving range, outputting a signal to magnetize the solenoid valve.

In a second structure of the invention, the second signal outputting means is constructed such that if the range shift detecting means detects the shift to the reverse driving range, the second signal outputting means outputs a signal to magnetize the solenoid valve until engagement of the second friction engaging means is completed.

In a third structure of the invention, the second signal outputting means is set in accordance with a time length required for the engagement of the second friction engaging element to be completed after the shift to the reverse driving range has been performed, and the second signal outputting means has timer means for starting to measure time after the shift to the reverse driving range has been detected, and the second signal outputting means outputs a signal to magnetize the solenoid valve until measurement of time by the timer means is completed.

In a fourth structure of the invention, the control apparatus further comprises engine operational condition detecting means for detecting an operational condition of the engine, and the electronic control means includes stopping means for, when it is determined by the engine operational condition detecting means that the engine speed equals or exceeds a predetermined value, stopping the second signal outputting means from outputting the signal to magnetize the solenoid valve.

With the above-described initial structure of the invention, for the shift to the forward driving range, the changeover valve operates to supply the forward driving range pressure to the first hydraulic servo when signal pressure is not supplied, and operates to discontinue the supply only when signal pressure is supplied, as in the conventional art. Thus, if supply of the signal pressure should fail, the forward driving pressure is reliably supplied to maintain the forward driving. Furthermore, the solenoid valve operates to discharge the signal pressure when demagnetized, and operates to supply the signal pressure when magnetized, so that the forward driving can be maintained even if an electrical failure occurs. As a feature of the invention, when the shift to the forward driving range is detected, the regulated fluid pressure from the pressure regulating means is supplied to the first hydraulic servo to engage the first clutch with a predetermined clutch characteristic. Since the signal pressure to switch the states of the changeover valve is supplied from the solenoid valve with its basic pressure being the line pressure in this operation, no delay in switching the changeover valve occurs in response to the shift to the forward driving range. On the other hand, when the shift to the reverse driving range is detected by the range shift detecting means, the electronic control means magnetizes the solenoid valve, so that the signal pressure will not be discharged. Since no unnecessary fluid pressure is discharged, supply of the fluid pressure to the second hydraulic servo is not delayed by the pressure reduction which would otherwise be caused. The apparatus thus prevents delay in achieving the reverse driving. Although the changeover valve is switched by the magnetization of the solenoid valve, the forward driving range pressure is not supplied to the changeover valve when a shift has been made to the reverse driving range, so that the first hydraulic servo is not supplied with any fluid pressure. Thus, when the reverse driving range has been selected, the shifting of the changeover valve has no effect on the other operation.

When the solenoid valve is magnetized to reduce the fluid loss for the shift to the reverse driving range, the current flowing through the solenoid valve causes heat generation by the solenoid valve and an increase in the power consumption. However, the second structure described above keeps the solenoid valve magnetized only during a period until the completion of the engagement of the second friction engaging element where the fluid pressure loss matters. Thus, this structure reduces heat generation of the solenoid valve and keeps the power consumption to minimum needed levels while preventing delay in achieving the reverse driving.

The third structure described above determines whether engagement of the second friction engaging element is completed by using the timer. With this simple structure requiring no special detecting means, the apparatus sets a period for magnetizing the solenoid valve in accordance with the actual need. This structure also reduces heat generation of the solenoid valve and the power consumption to minimum needed levels while preventing delay in achieving the reverse driving, as stated above.

With the fourth structure described above, the apparatus performs the control to stop the shift of the solenoid valve to the magnetized state when the engine speed is high. This structure thus reduces heat generation of the solenoid valve and the power consumption to minimum needed levels.

BRIEF DESCRIPTION OF THE DRAWINGS

The foregoing and further objects, features and advantages of the invention will become apparent from the following description of a preferred embodiment with reference to the accompanying drawings, wherein:

FIG. 3 is a table showing various operations of the automatic transmission;

DETAILED DESCRIPTION OF PREFERRED EMBODIMENT

Figure 1:
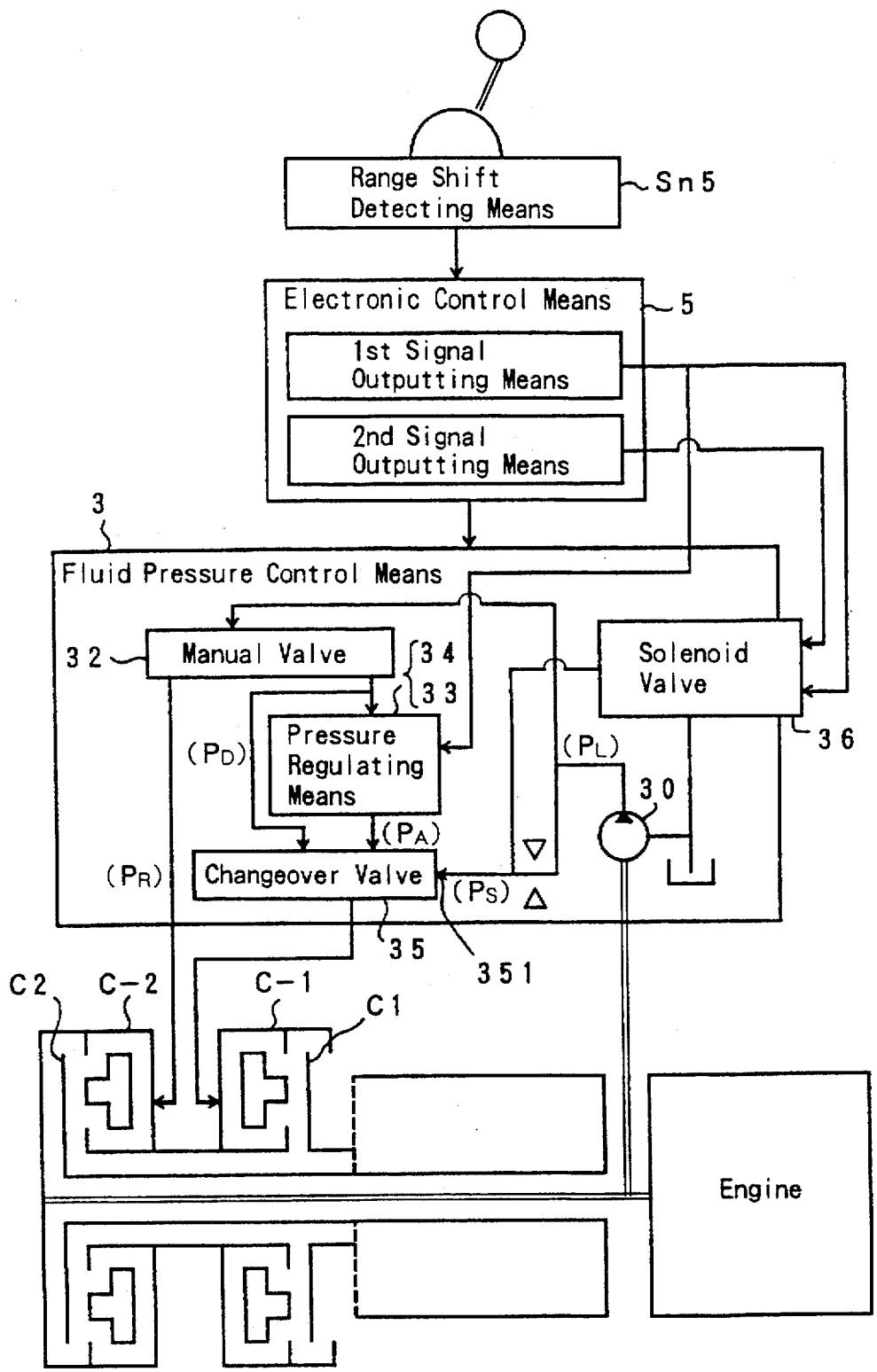
FIG. 1 is a schematic block diagram of an embodiment of the invention.

A preferred embodiment of the invention will be described hereinafter with reference to the drawings. FIG. 1 is a schematic block diagram of the embodiment. The automatic transmission control apparatus comprises a first friction engaging element C1 which, when a forward driving range is selected, is engaged to achieve forward driving; a second friction engaging element C2 which, when a reverse driving range is selected, is engaged to achieve reverse driving; first and second hydraulic servos C-1, C-2 for engaging and releasing the first and second friction engaging elements C1, C2, respectively; fluid pressure control means 3 for controlling fluid pressure supply to the first and second hydraulic servos C-1, C-2; range shift detecting means Sn5 for detecting shift to the forward driving range and shift to the reverse driving range; and electronic control means 5 for controlling the fluid pressure control means 3 on the basis of a signal from the range shift detecting means Sn5.

The fluid pressure control means 3 has an oil pump 30 driven together with engine revolution and forming a fluid pressure source for line pressure ($P_L$); a manual valve 32 for supplying a forward driving range pressure ($P_D$) as the line pressure ($P_L$) to the first hydraulic servo C-1 when the forward driving range is selected, and for supplying a reverse driving range pressure ($P_R$) as the line pressure ($P_L$) to the second hydraulic servo C-2 when the reverse driving range is selected; pressure regulating means 33, 34 disposed between the manual valve 32 and the first hydraulic servo C-1, for regulating the forward driving range pressure ($P_D$) on the basis of a signal from the electronic control means 5 to output a regulated fluid pressure ($P_A$); a changeover valve 35 having a signal pressure port 351 (FIG. 3) to which a signal pressure ($P_S$) is selectively supplied, the changeover valve 35 supplying the forward driving range pressure ($P_D$) to the first hydraulic servo C-1 when the signal pressure ($P_S$) is being supplied, and supplying the regulated fluid pressure ($P_A$) from the pressure regulating means 33, 34 to the first hydraulic servo C-1 when the signal pressure ($P_S$) is not supplied; and a solenoid valve 36 (FIG. 3) for supplying the signal pressure ($P_S$) as the line pressure ($P_L$) to the signal pressure port 351 of the changeover valve 35 when magnetized on the basis of a signal from the electronic control means 5, and for discharging the signal pressure ($P_S$) when demagnetized.

The electronic control means 5 has a first signal outputting means for, when the range shift detecting means Sn5 has detected shift to the forward driving range, outputting a signal to magnetize the solenoid valve 36 and to cause the pressure regulating means 33 to output a predetermined regulated fluid pressure ($P_A$); and a second signal outputting means for, when the range shift detecting means Sn5 has detected shift to the reverse driving range, outputting a signal to magnetize the solenoid valve 36.

Figure 2:
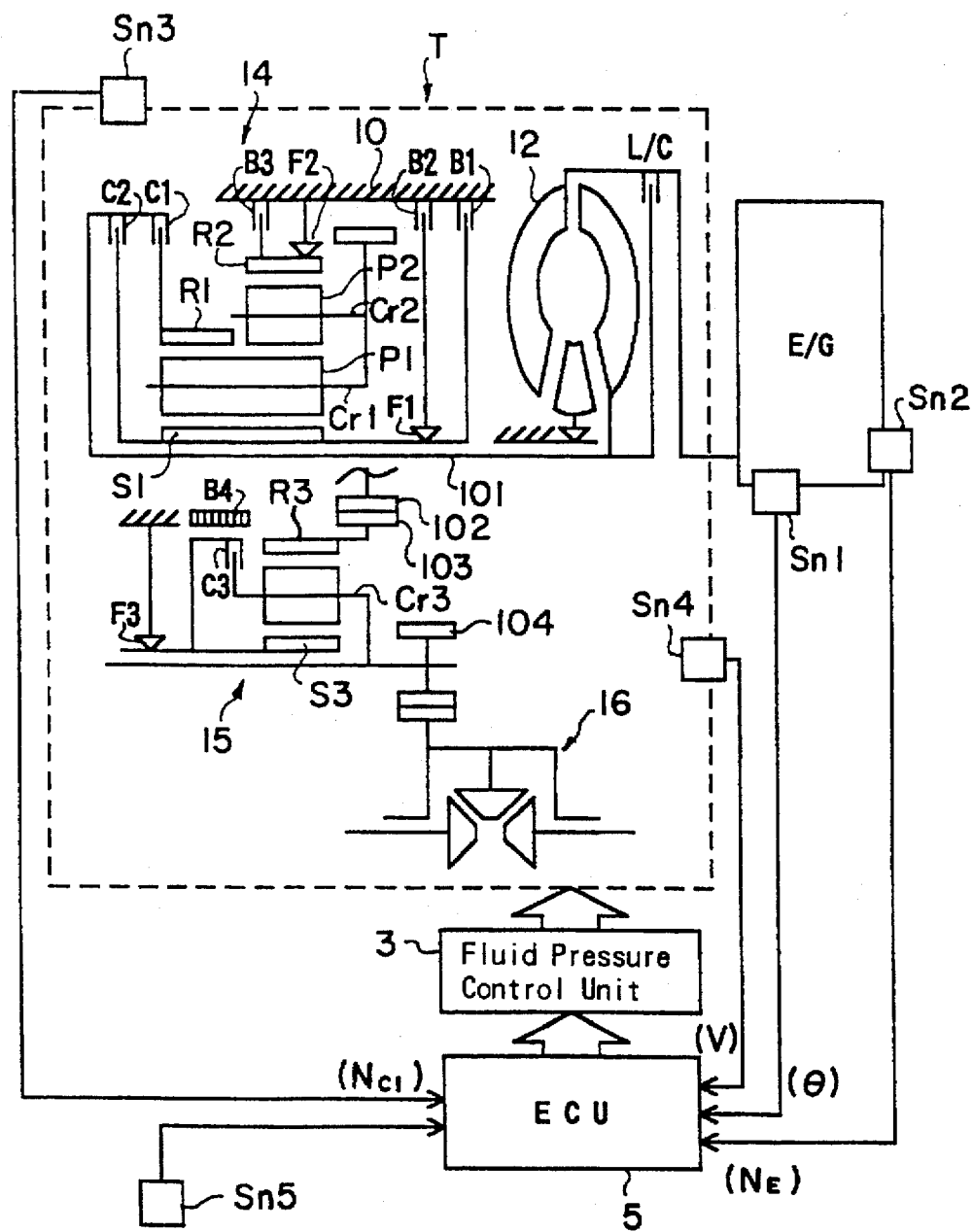
FIG. 2 is a schematic diagram of the overall structure of an automatic transmission according to the embodiment, illustrating the mechanical portions.

Various component portions of the embodiment will be described in detail. As illustrated in FIG. 2, the automatic transmission T according to this embodiment has a gear train of four forward speeds and one reverse speed for a front-engine, frontwheel-drive vehicle. The automatic transmission T comprises a torque converter 12 having a lockup clutch L/C; a biaxial gear train having a main speed changing unit 14 and an under drive-type planetary gear unit 15; a differential unit 16; a fluid pressure control unit 3 provided as the fluid pressure control means for controlling the gear train and the lockup clutch L/C; and an electronic control unit (ECU) 5 provided as the electronic control means for controlling the fluid pressure control unit 3.

FIG. 2 further shows an engine E/G, a throttle sensor Sn1 for detecting throttle opening (θ) of the engine E/G; an engine speed sensor Sn2 for detecting engine speed ($N_E$); a clutch rotational speed sensor Sn3 for detecting rotational speed ($N_{C1}$) of the clutch C1 provided as the first friction engaging means of the automatic transmission T; a vehicle speed sensor Sn4 for detecting vehicle speed (V) based on output speed; and a neutral start switch Sn5 provided as range shift detecting means for detecting shift position. According to this embodiment, the engine speed sensor Sn2 and the clutch rotational speed sensor Sn3 constitute engine operational condition detecting means. The electronic control unit 5 is a control computer that outputs control signals to the on-off solenoid valve and linear solenoid valve of the fluid pressure control unit 3 on the basis of information from the various sensors, mainly in accordance with the throttle opening (θ) and the vehicle speed (V), following the installed program.

The main speed changing unit 14 of the gear train of the automatic transmission T comprises a single pinion-type planetary gear unit and a double pinion-type planetary gear unit. The two gear units are combined by using an integrated sun gear Si and integrating with one set of pinion gears P1 of the double pinion-type gear unit with the planetary gears of the single pinion-type gear unit, and by connecting a carrier Cr1 supporting the pinion gears P1 and a carrier Cr2 supporting the other set of pinion gears P2 of the double pinion-type gear unit. The sun gear S1 common to the two planetary gear units of the main speed changing unit 14 is fixable to a transmission casing 10 by a brake B1, and also fixable to the casing 10 by a one-way clutch F1 and a brake B2 that are disposed in series. A ring gear R1 of the single pinion-type planetary gear unit is connected to an input shaft 101 by the clutch C1 provided as the first friction engaging element according to the invention. The sun gear S1 is also connected to the input shaft 101 by a clutch C2 provided as the second friction engaging means according to the invention. The input shaft 101 is connected to a turbine output shaft of the torque converter 12. The carrier Cr1, supporting the pinion gears P1 meshed with the sun gear S1, the ring gear R1 and the pinion gears P2, and the carrier Cr2, supporting the pinion gears P2 meshed with the pinion gears P1 and a ring gear R2, are connected by a counter gear 102. The ring gear R2 of the double pinion-type planetary gear unit is fixable to the transmission casing 10 by a brake B3 and a one-way clutch F2 that are disposed in parallel.

A ring gear R3 of the under drive planetary gear unit 15 is an input element connected to the main speed changing unit 14 by the counter gears 102, 103. A carrier Cr3 and a sun gear S3 are connected by a clutch C3. The sun gear S3 is fixable to the transmission casing 10 by a one-way clutch F3 and a band brake B4 that are disposed in parallel. The carrier Cr3 is connected to an output gear 104 for transmission to the differential unit 16.

In the gear train as described above, under an under drive rotational state where the sun gear S3 of the under drive planetary gear unit 15 is fixed with the clutch C3 released and the brake B4 engaged, so as to achieve input to the ring gear R3 and output from the carrier Cr3, the first speed is achieved when the input transmitted to the ring gear R1 by engagement of the clutch C1 of the main speed changing unit 14 is output as rotation of the carriers Cr1, Cr2 by reaction force support of the ring gear R2 provided by engagement of the one-way clutch F2. The second speed is achieved when the input to the ring gear R1 is output as rotation of the carriers Cr1, Cr2 while the sun gear S1 is fixed by the engagement of the brake B2. The third speed is achieved when the main speed changing unit 14 is in the direct-coupled state where the clutch C2 is additionally engaged to rotate the ring gear R1 and the sun gear S1 at the same speed, so that the input rotation is directly outputted from the carriers Cr1, Cr2. In a direct-coupled state of the under drive planetary gear unit 15 achieved by release of the brake B4 and engagement of the clutch C3, the fourth speed is achieved. The reverse is achieved when the clutch C2 is engaged and the brake B3 is engaged to achieve input to the sun gear S1 and fixation of the ring gear R2 so that rotation of the carrier Cr2 reverses.

FIG. 3 shows a table showing the relationship between the operation of the clutches, the brakes and the one-way clutches and the thereby-achieved gear speeds, that is, the first to the fourth speeds, reverse and neutral. In the table, "R" indicates the reverse drive position; "N" indicates the neutral position; "D" indicates the forward drive shift positions; "○" indicates engagement; "X" indicates release; and (○) indicates engagement effected only during engine braking.

Figure 4:
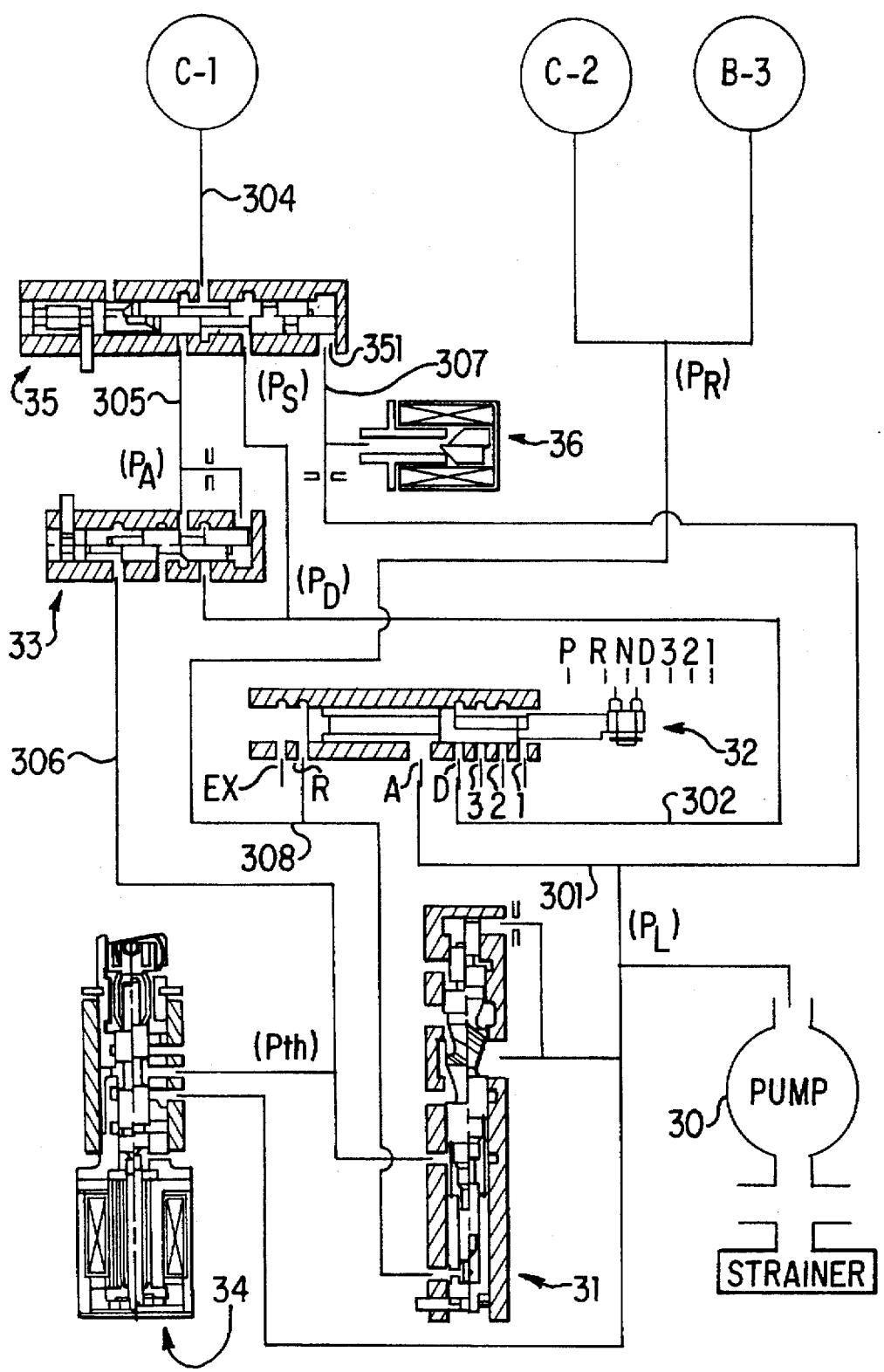
FIG. 4 is a partial circuit diagram of a fluid pressure control unit of the automatic transmission.

Referring to FIG. 4, the hydraulic circuit for controlling the gear train described above comprises, as in the hydraulic circuit of a conventional fluid pressure control apparatus, an oil pump (PUMP) 30 as a fluid pressure source incorporated in the speed changing mechanism, various pressure regulating valves that include a primary regulator valve 31 for regulating the pressure from the oil pump 30 to a predetermined stable line pressure ($P_L$) in accordance with the vehicle speed and the throttle opening to output a secondary pressure and a secondary regulator valve (not shown) for reducing the secondary pressure to a regulated torque converter pressure supply and outputting the remaining pressure as a lubrication pressure, the manual valve 32, various solenoid valves that include the solenoid valve 36 and a linear solenoid valve 34, various shift valves, orifices and check valves disposed in the passages connecting the various valves.

FIG. 4 is illustrates only portions of the above described hydraulic circuit that are relevant to the invention. This circuit controls a combination of the hydraulic servo C-1 of the clutch C1 that engages when the forward driving range is selected, the hydraulic servo C-2 of the clutch C2 that engages when the reverse driving range is selected, and a hydraulic servo B-3 of the brake B3 that also engages when the reverse driving is selected. The circuit comprises the manual valve 32, a C-1 control valve 33, the linear solenoid valve 34 for controlling the C-1 control valve 33, a C-1 changeover valve 35, and the solenoid valve 36 for controlling the C-1 changeover valve 35. The manual valve 32 is connected to a line pressure fluid passage 301 provided as an input fluid passage connecting to the discharge end of the oil pump 30. The manual valve 32 is also connected to an R range pressure fluid passage 308 and a D range pressure fluid passage 302 provided as output fluid passages connecting to the above-mentioned hydraulic servos. When the D range is selected, a D range pressure ($P_D$) is outputted into the above-mentioned output fluid passages. When the R range is selected, arrange pressure ($P_R$) is outputted thereinto. (The D or R range pressure is the line pressure (PL) determined in accordance with the current throttle opening (θ).)

The C-1 control valve 33 is a secondary pressure-operated pressure reducing valve that receives at the opposite ends of the spool the throttle signal pressure (Pth) and the feedback pressure of the regulated fluid pressure ($P_A$) to the clutch C1 to adjust the openings of the output, input and drain ports. The input port is connected to the D range pressure fluid passage 302. The output port is connected to a regulated fluid pressure output fluid passage 305. The signal port is connected to a throttle signal pressure fluid passage 306. The feedback port is connected to the regulated fluid pressure output fluid passage 305 through an orifice. The linear solenoid valve 34 outputs the throttle signal pressure (Pth) provided by reducing the line pressure ($P_L$) as the basic pressure, on the basis of the signal from the electronic control unit 5. The throttle signal pressure (Pth) is supplied to the primary regulator valve 31 and the C-1 control valve 33 through the throttle signal pressure fluid passage 306. Thus, the C-1 control valve 33 and the linear solenoid valve 34 perform the function of the pressure regulating means for regulating the line pressure ($P_L$) on the basis of the signal from the electronic control unit 5 and for outputting the regulated fluid pressure ($P_A$).

The C-1 changeover valve 35 is a spool-type changeover valve that selectively communicates the output port with the input port connecting to the regulated fluid pressure output fluid passage 305 or the input port connecting to the D range pressure fluid passage 302. The C-1 changeover valve 35 is switched by a solenoid signal pressure ($P_S$) supplied to a signal pressure port 351, the solenoid signal pressure ($P_S$) opposing the spring force acting on an end of the spool. The solenoid valve 36 is a normal open-type on-off valve that closes upon receiving the solenoid magnetizing signal ($S_L1$) from the electronic control unit 5. The solenoid valve 36 drains the fluid pressure from a solenoid signal pressure fluid passage 307 connecting to the line fluid passage 301 through an orifice, and stops draining the pressure. Thus, the C-1 changeover valve 35 and the solenoid valve 36 are selectively changed over between a first position (indicated in the lower half of the illustration of each of the valves in the drawing) for supplying the line pressure ($P_L$) to the hydraulic servo C-1 of the clutch C1 through the fluid passage 304 and a second position (indicated in the upper half of the illustration of each of the valves in the drawing) for supplying the regulated fluid pressure ($P_A$) thereto, by the signal from the electronic control unit 5.

Figure 5:
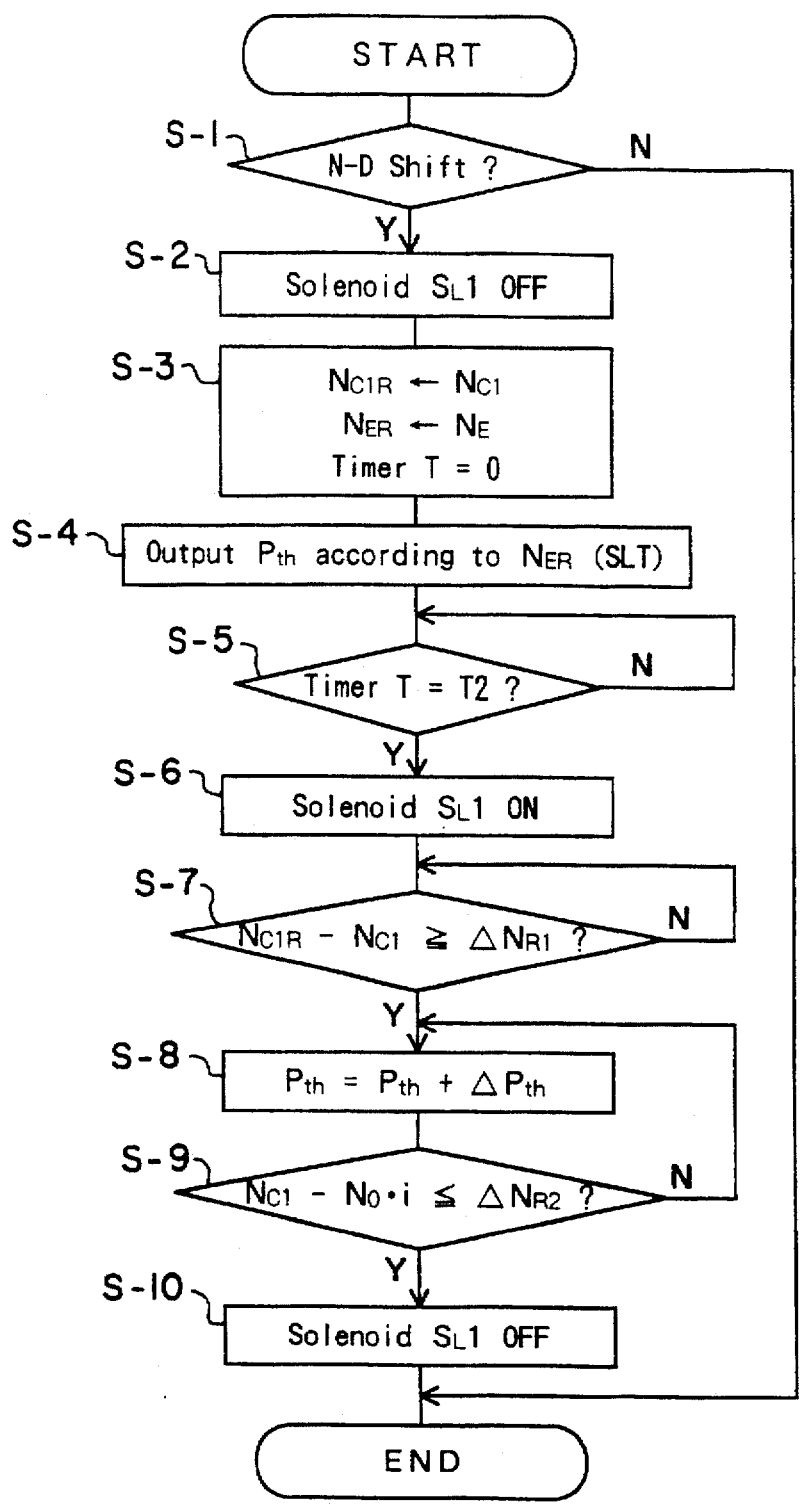
FIG. 5 is a flowchart illustrating the N-to-D shift operation of the control apparatus according to the embodiment.

The above-described hydraulic circuit as shown in FIG. 4 is controlled by the electronic control unit 5. Referring to the flowchart shown in FIG. 5, step S-1 determines whether the N-to-D shift from the N range to the D range has been performed, on the basis of the signal from the neutral start switch Sn5. The affirmative determination in step S-1 is followed by step S-2 where the magnetizing signal ($S_L1$) to the solenoid valve 36 is turned off. The fluid pressure of the fluid passage 307 is thus drained, so that the C-1 changeover valve 35 takes the first position, that is, the position of the spool indicated in the lower half of the valve in FIG. 4. Thereby, the line pressure ($P_L$) of the D range pressure fluid passage 302 starts to be supplied to the hydraulic servo C-1 via the C-1 changeover valve 35 and the fluid passage 304.

Then, step S-3 sets the current rotational speed ($N_{C1}$) of the clutch C1 as the clutch rotational speed ($N_{C1R}$) at the time of the N-to-D shift, and the current engine speed ($N_E$) as the engine speed ($N_{ER}$) at the time of the N-to-D shift, and also resets a timer T. Instep S-4, the C-1 control valve 33 is supplied with the signal pressure ($P_{th}$) from the linear solenoid valve 34 in accordance with the engine speed ($N_{ER}$), and the C-1 control valve 33 outputs a regulated fluid pressure ($P_A$) in accordance with the signal pressure ($P_{th}$). Step S-5 determines whether the value of the timer T has become T2. According to this embodiment, the timer value T2 is preset to a time point slightly preceding the time point to start engaging the clutch C1. The reason for this setting is that if the timer is set so that the magnetizing signal ($S_L1$) to the solenoid is turned on by the start of the engagement, a detection delay may cause an incident where the hydraulic servo C-1 is supplied with the line pressure ($P_L$) even though the clutch C1 has started engaging. The steps described above perform the control for causing the hydraulic servo C-1 to rapidly operate its piston until the engagement is achieved.

If step S-5 determines that the value of the timer T has become equal to T2 after repeating time measurement of the timer T, step S-6 turns on the magnetizing signal ($S_L1$) to the solenoid valve 36. The C-1 changeover valve 35 is thereby switched to supply the hydraulic servo C-1 with a regulated fluid pressure ($P_A$) from the C-1 control valve 33 caused to output regulated stable fluid pressure ($P_A$) in step S-4. Step S-6 and step S-4 constitute first signal outputting means according to the present invention. Then, step S-7 determines that the engagement has started when the current rotational speed ($N_{C1}$) of the clutch C1 has become less than the rotational speed ($N_{C1R}$) of the clutch C1 at the time of the N-to-D shift by at least a predetermined value ($\Delta N_{R1}$). Based on the determination in step S-7, step S-8 increases the fluid pressure supply ($P_{C1}$) to the hydraulic servo C-1 by a predetermined amount ($\Delta P_{th}$) in a cycle of a predetermined length of time. The predetermined amount ($\Delta P_{th}$) is preset in accordance with the input torque. More specifically, the predetermined amount ($\Delta P_{th}$) increases with increases of the input torque. The input torque is detected on the basis of the throttle opening ($\theta$) according to this embodiment. Then, step S-9 determines that the control is to be ended, when the clutch C1 has substantially completed engagement, more specifically, when the difference between the current input rotational speed ($N_{C1}$) of the clutch C1 and the output rotational speed (No.i) (that is, the rotational speed obtained by multiplying the first speed gear ratio i with the output rotational speed (No) detected by the vehicle speed sensor Sn4) of the clutch C1 has become a predetermined value ($\Delta N_{R2}$) or less. Based on the determination in step S-9, the last step S-10 turns off the magnetizing signal ($S_L1$) to the solenoid valve 36. The C-1 changeover valve 35 is thereby switched back to the state for directly supplying the line pressure ($P_L$).

The solenoid valve 36 is a normal open-type on-off valve that closes upon receiving the magnetizing signal as described above. For the N-to-R shift for which the control described above is not performed, the solenoid valve 36 allows for drain through the fluid passage 307 since the solenoid magnetizing signal ($S_L1$) is off. Therefore, the reduction of the fluid pressure of the line pressure fluid passage 301 caused by the amount of fluid drained from the solenoid valve 36 cannot be ignored when the N-to-R shift is performed under this condition, particularly, if the throttle opening is small so that the pump discharge fluid amount is small. As a result, low pressure occurs in the R range pressure fluid passage 307, which is supplied with the engaging pressure from the line pressure fluid passage 301. To avoid this, the solenoid valve 36 is controlled as follows, according to the invention.

Figure 6:
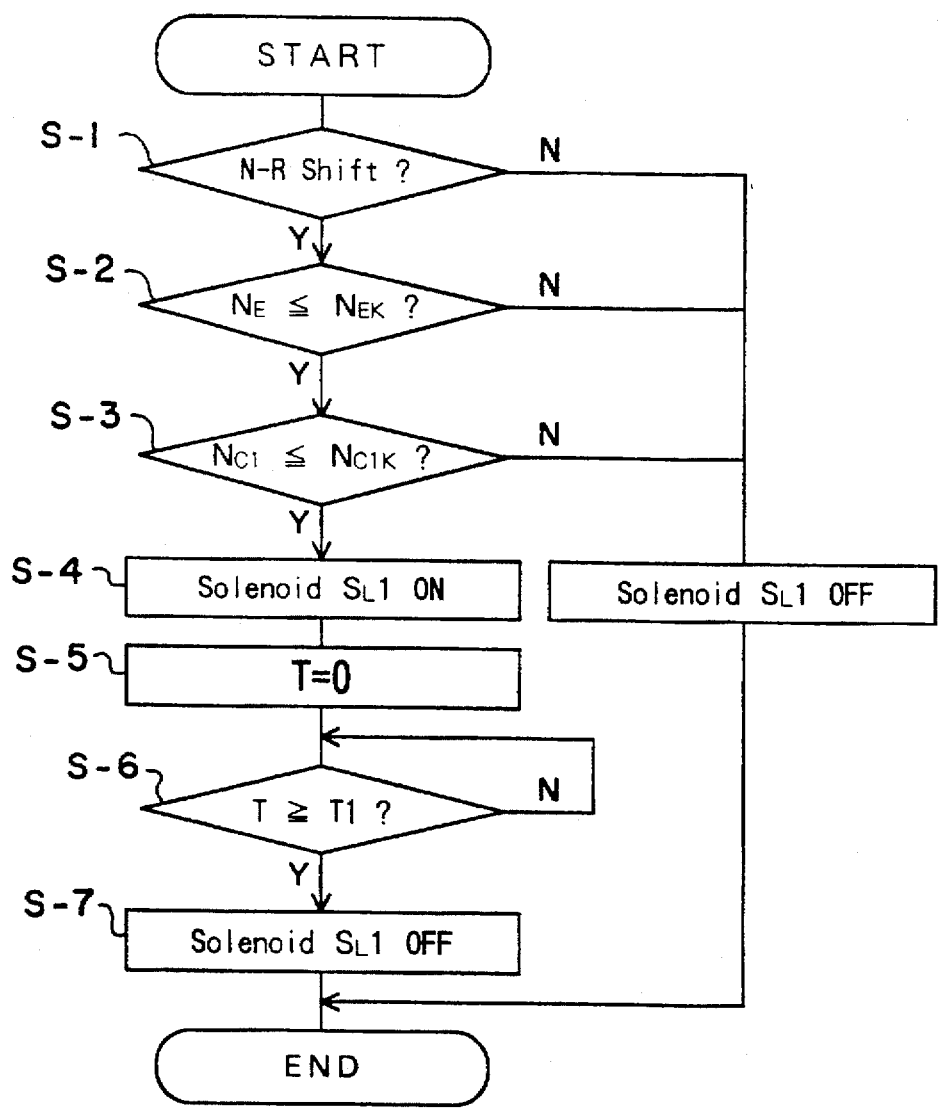
FIG. 6 is a flowchart illustrating the N-to-R shift operation of the control apparatus according to the embodiment.

FIG. 6 shows the flowchart illustrating the control of the solenoid valve 36 performed for the N-to-R shift. Step S-1 makes determination regarding the N-to-R shift on the basis of the signal from the neutral start switch Sn5. Steps S-2 and S-3 are performed to exclude from this control operation the cases where the engine speed or the corresponding rotational speed of the clutch C1 detected by the engine speed sensor Sn2 or the clutch rotational speed sensor Sn3, which constitute the engine operational condition detecting means, equals or exceeds a predetermined value ($N_{EK}$ or $N_{C1K}$). In these cases, the discharge pressure from the oil pump 30 is high so that the problem of low pressure will not occur. If all the three steps make affirmative determinations, the operation proceeds to step S-4 where the electronic control unit 5 outputs the solenoid magnetizing signal ($S_L1$) to turn on the solenoid valve 34. Step S-4 constitutes second signal outputting means according to the invention. Simultaneously with step S-4, step S-5 resets the timer T. Step S-6 repeats the process of determination regarding the elapsed time. When a predetermined length of time T1 has elapsed, step S-7 turns off the solenoid magnetizing signal ($S_L1$) to end the control. The timer measurement time T1 used for this control is preset to a time length taken until the clutch C2 and the brake B3 engage and the reverse driving is achieved.

Figure 7A:
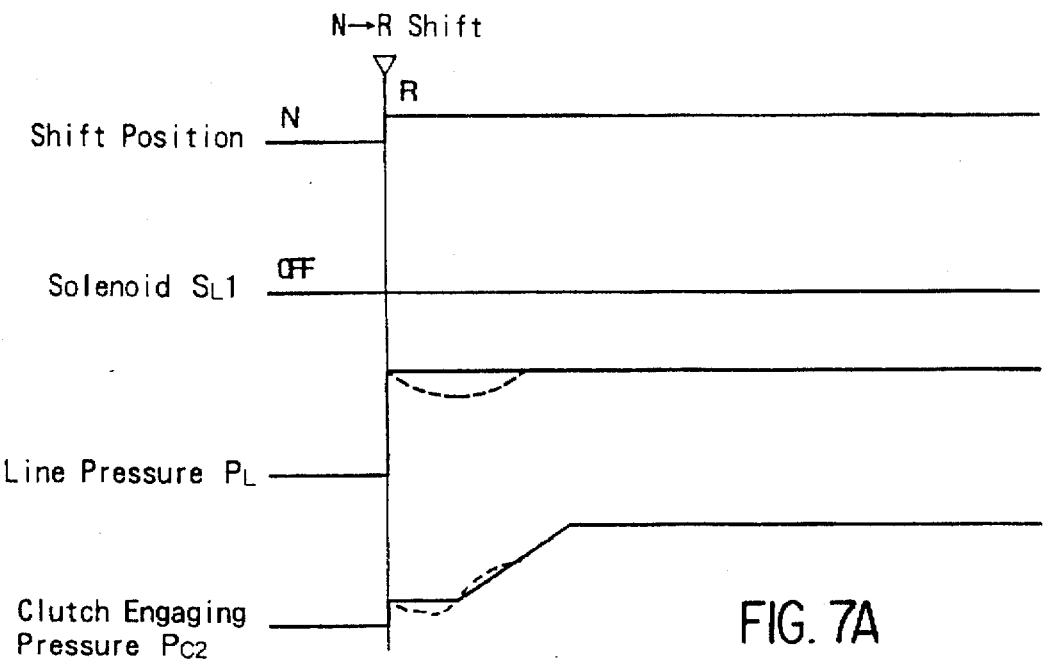
FIG. 7A shows a timing chart where the N-to-R shift control is not performed.
Figure 7B:
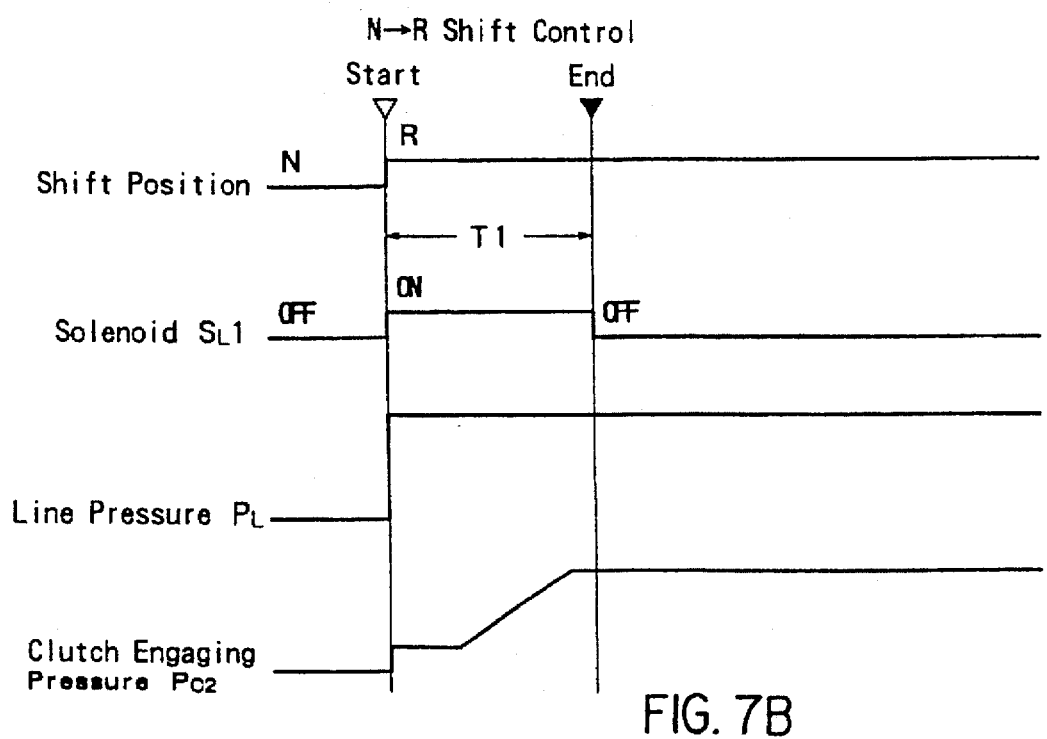
FIG. 7B shows a timing chart indicating the N-to-R shift operation of the control apparatus according to the embodiment.

FIG. 7B shows timing charts according to the flowchart described above compared with a case where the control according to the invention is not performed (FIG. 7A). In the case indicated in FIG. 7A where the control is not performed, the solenoid magnetizing signal $S_L1$ remains off for the N-to-R shift, so that the line pressure ($P_L$) experiences the problem of low pressure as indicated by a broken line, particularly if the throttle opening is small. Affected by this low pressure, the clutch engaging pressure ($P_{C2}$) also experiences the problem of low pressure at its rising as indicated by a broken line. In contrast, in the case indicated in FIG. 7B where the control according to the invention is performed, the solenoid magnetizing signal ($S_L1$) is turned on simultaneously with the N-to-R shift, so that the drainage is closed. Thus, this control prevents the problem of low pressure in the line pressure ($P_L$) and, therefore, prevents the problem of low pressure in the clutch engaging pressure ($P_{C2}$) at the rising.

To summarize, according to this embodiment, the changeover valve 33 communicates the D range pressure fluid passage 302 with the first hydraulic servo C-1 when not supplied with the signal pressure ($P_S$), and discontinues the communication between the D range pressure fluid passage 302 and the first hydraulic servo C-1 only when supplied with the signal pressure ($P_S$), as indicated in FIG. 4. Therefore, even if supply of the signal pressure ($P_S$) discontinues by some cause, the embodiment maintains the forward driving. In addition, the solenoid valve 36, when demagnetized, assumes the position indicated in the lower half of its illustration in FIG. 4, so that the signal pressure ($P_S$) is discharged. When magnetized, the solenoid valve 36 assumes the position indicated by the upper half of its illustration, to supply the signal pressure ($P_S$). Therefore, even if an electrical failure occurs, the embodiment maintains the forward driving as in the conventional art. When the shift to the D range is detected, the regulated fluid pressure ($P_A$) from the pressure regulating means 33, 34 is supplied to the first hydraulic servo C-1 to engage the first clutch C1 with a predetermined engaging characteristic. In this operation, since the signal pressure ($P_S$) used to switch the changeover valve 35 is based on the line pressure (PL), that is, the basic pressure, and controlled by the solenoid 36, the switching of the changeover valve 35 will not delay in response to the shift to the D range. When the shift to the R range is detected by the neutral start switch Sn5, the solenoid valve 36 is magnetized to discontinue the drain of the signal pressure ($P_S$). Thus, no unnecessary fluid pressure is discharged and, therefor, no delay occurs in supplying the fluid pressure to the second hydraulic servo C-2 for achieving the reverse driving. Delay in the achievement of reverse driving is thus prevented. In this operation, although the changeover valve 35 is switched by magnetization of the solenoid valve 36, the first hydraulic servo C-1 is not supplied with fluid pressure since the D range pressure is not being supplied. Thus, when the D range is selected, the switching of the changeover valve 35 has no effect on the operation.

While the invention has been described with reference to what is presently considered to be a preferred embodiment thereof, it is to be understood that the invention is not limited to the disclosed embodiments. To the contrary, the invention is intended to cover various modifications and equivalent arrangements included within the spirit and scope of the appended claims.

What is claimed is:

1. An automatic transmission control apparatus, comprising:

a first friction engaging element which, when a forward driving range is selected, is engaged to achieve forward driving;

a second friction engaging element which, when a reverse driving range is selected, is engaged to achieve reverse driving;

first hydraulic servo and second hydraulic servo for engaging and releasing said first friction engaging element and said second friction engaging element, respectively;

fluid pressure control means for controlling fluid pressure supply to said first hydraulic servo and said second hydraulic servo;

range shift detecting means for detecting shift to said forward driving range and shift to said reverse driving range; and electronic control means for controlling said fluid pressure control means on the basis of a signal of detection of the range shift detecting means, said fluid pressure control means comprising:

an oil pump driven together with revolution of an engine, said oil pump forming a fluid pressure source for a line pressure;

a manual valve for supplying a forward driving range pressure as said line pressure to said first hydraulic servo when said forward driving range is selected, and for supplying a reverse driving range pressure as said line pressure to said second hydraulic servo when said reverse driving range is selected;

pressure regulating means disposed between said manual valve and said first hydraulic servo, for regulating said forward driving range pressure on the basis of a signal from said electronic control means to output a regulated fluid pressure;

a changeover valve having a signal pressure port to which a signal pressure is selectively supplied, said changeover valve supplying said forward driving range pressure to said first hydraulic servo when said signal pressure is being supplied to said signal pressure port, and said changeover valve supplying said regulated fluid pressure from said pressure regulating means to said first hydraulic servo when said signal pressure is not supplied to the signal pressure port; and a solenoid valve for supplying said signal pressure as said line pressure to said signal pressure port of said changeover valve when magnetized on the basis of a signal from said electronic control means, and for discharging said signal pressure from said signal pressure port when demagnetized, said electronic control means comprising:

first signal outputting means for, when said range shift detecting means has detected shift to said forward driving range, outputting a signal to magnetize said solenoid valve and to cause said pressure regulating means to output a predetermined regulated fluid pressure; and second signal outputting means for, when said range shift detecting means has detected shift to said reverse driving range, outputting a signal to magnetize said solenoid valve.

2. An automatic transmission control apparatus according to claim 1, wherein when said range shift detecting means detects the shift to said reverse driving range, said second signal outputting means outputs a signal to magnetize said solenoid valve until engagement of said second friction engaging means is completed.

3. An automatic transmission control apparatus according to claim 1, wherein said second signal outputting means is set in accordance with a time length required for the engagement of said second friction engaging element to be completed after the shift to said reverse driving range has been performed, and wherein said second signal outputting means has timer means for starting to measure time after the shift to said reverse driving range has been detected, and said second signal outputting means outputs a signal to magnetize said solenoid valve until measurement of time by said timer means ends.

4. An automatic transmission control apparatus according to claim 1, further comprising engine operational condition detecting means for detecting operational condition of said engine, said electronic control means including stopping means for, when it is determined by said engine operational condition detecting means that the engine speed equals or exceeds a predetermined value, stopping said second signal outputting means from outputting the signal to magnetize said solenoid valve.

5. An automatic transmission control apparatus according to claim 2, further comprising engine operational condition detecting means for detecting operational condition of said engine, said electronic control means including stopping means for, when it is determined by said engine operational condition detecting means that the engine speed equals or exceeds a predetermined value, stopping said second signal outputting means from outputting the signal to magnetize said solenoid valve.

6. An automatic transmission control apparatus according to claim 3, further comprising engine operational condition detecting means for detecting operational condition of said engine, said electronic control means including stopping means for, when it is determined by said engine operational condition detecting means that the engine speed equals or exceeds a predetermined value, stopping said second signal outputting means from outputting the signal to magnetize said solenoid valve.

* * * * *